(12) United States Patent
Tervonen

(10) Patent No.: US 7,302,401 B1
(45) Date of Patent: Nov. 27, 2007

(54) DATA MANAGEMENT MECHANISM FOR PROJECT PLANNING

(75) Inventor: Eero Tervonen, Espoo (FI)

(73) Assignee: Single Source Oy, Helsinki (FI)

( * ) Notice: Subject to any disclaimer, the term of this patent is extended or adjusted under 35 U.S.C. 154(b) by 0 days.

(21) Appl. No.: 09/958,353

(22) PCT Filed: Apr. 4, 2000

(86) PCT No.: PCT/FI00/00290

§ 371 (c)(1),
(2), (4) Date: Feb. 15, 2002

(87) PCT Pub. No.: WO00/60510

PCT Pub. Date: Oct. 12, 2000

(30) Foreign Application Priority Data

Apr. 6, 1999 (FI) .................................. 990754

(51) Int. Cl.
G06F 9/46 (2006.01)
(52) U.S. Cl. .......................................................... 705/9
(58) Field of Classification Search ...................... 705/9
See application file for complete search history.

(56) References Cited

U.S. PATENT DOCUMENTS

| | | |
|---|---|---|
| 5,016,170 A | 5/1991 | Pollalis et al. |
| 5,526,520 A | 6/1996 | Krause |
| 5,544,352 A | 8/1996 | Egger |
| 5,671,361 A * | 9/1997 | Brown et al. ................... 705/9 |
| 5,709,410 A * | 1/1998 | Reeves, Jr. .................... 283/67 |
| 5,761,361 A * | 6/1998 | Pfandl et al. ............... 385/100 |
| 5,765,140 A * | 6/1998 | Knudson et al. ............... 705/9 |
| 5,890,131 A * | 3/1999 | Ebert et al. .................... 705/7 |
| 6,023,702 A * | 2/2000 | Leisten et al. .............. 707/100 |
| 6,037,937 A * | 3/2000 | Beaton et al. ............... 715/764 |
| 6,041,303 A * | 3/2000 | Mathews ....................... 705/1 |
| 6,092,048 A * | 7/2000 | Nakaoka ........................ 705/9 |

(Continued)

FOREIGN PATENT DOCUMENTS

EP 314 596 5/1989

(Continued)

OTHER PUBLICATIONS

Schmidt "Scheduling monitoring of engineering projects) discloses a system for monitoring the progress of a project"; May 1988; IEEE Transaction on Engineering Management, vol. 35, No. 2; pp. 108-117.*

(Continued)

*Primary Examiner*—Romain Jeanty
(74) *Attorney, Agent, or Firm*—Barnes & Thornburg LLP

(57) ABSTRACT

A method of managing project time/resource data and documents in response to commands given by a user. The method includes setting up a user interface for bidirectional communication with a user of a computer system. The user interface displays symbols to the user and receives a selection made by the user via a pointer. The user interface displays several first symbols simultaneously to show project time/resource data, and several second symbols to show identifiers of the corresponding documents. Data is received about a second symbol selected by the user, and in response thereto, the user is at least provided with an opportunity to open a document corresponding to the second symbol.

5 Claims, 3 Drawing Sheets

U.S. PATENT DOCUMENTS

| | | | | |
|---|---|---|---|---|
| 6,092,050 | A * | 7/2000 | Lungren et al. | 705/36 R |
| 6,101,481 | A * | 8/2000 | Miller | 705/9 |
| 6,308,164 | B1 * | 10/2001 | Nummelin et al. | 705/9 |
| 6,469,715 | B1 * | 10/2002 | Carter et al. | 715/763 |
| 6,487,469 | B1 * | 11/2002 | Formenti | 700/97 |
| 6,581,040 | B1 * | 6/2003 | Wright et al. | 705/8 |
| 6,678,698 | B2 * | 1/2004 | Fredell et al. | 707/104.1 |
| RE38,633 | E * | 10/2004 | Srinivasan | 707/10 |
| 6,842,760 | B1 * | 1/2005 | Dorgan et al. | 707/104.1 |
| 6,895,382 | B1 * | 5/2005 | Srinivasan et al. | 705/7 |

FOREIGN PATENT DOCUMENTS

| | | |
|---|---|---|
| EP | 415 796 | 3/1991 |
| EP | 549 442 | 5/1993 |
| WO | WO 9420918 A1 * | 9/1994 |
| WO | WO 97/07472 | 2/1997 |
| WO | WO 99/30223 | 6/1999 |

OTHER PUBLICATIONS

Paynter "Software engineering project management, estimation and metrics: Discussion summary and recommendations", 1996, IEEE, pp. 1-4.*

Mulvehill "User Interface for a Knowledge-Based Planning and Scheduling System", 1988, IEEE, pp. 514-521.*

Jurison "Software Project Management: The Manager's View", 1999, Communications of the Association for Information Systems, vol. 2.*

* cited by examiner

DATA MANAGEMENT MECHANISM FOR PROJECT PLANNING

This application is the National Phase of International Application PCT/FI00/00290 filed Apr. 4, 2000 which designated the U.S. and was published under PCT Article 21(2) in English.

BACKGROUND OF THE INVENTION

The invention relates to a data management mechanism which can be used for example to combine a project plan and documentation.

A project plan is typically drawn up by a team headed by a project manager or some other coordinator. A project plan is managed for example locally by a personal computer or by a planning system on a shared server. The plan is displayed to the other participants for example via a data network. In a well organized system documents and files related to the project are gathered into servers or databases either in a centralized manner or selectively according to different spheres of responsibility. The documentation related to the project is thus available to everybody for example via the Internet. A project plan can also be published similarly as other documents.

The Internet and WWW technology with their standards allow data systems of companies to communicate with corresponding systems of subcontractors and clients. This means that an ever-increasing complex can operate in a fully electrical form. One and the same project, such as a project for designing a complicated product, may involve several dozens of individual companies (subcontractors, suppliers, consultants, the client, etc.) or parts of a big conglomerate in the subcontracting chain.

Manufacturers provide several commercial software products and systems for both project management and management of documents and data. Examples of project management programs include Microsoft® Project (Microsoft Corp., Redmond, Wash., USA) and Primavera® Project Planner (Primavera Systems Inc., Philadelphia, Pa., USA). Examples of document and data management software include Kronodoc (Single Source Oy, Espoo, Finland), OpenText-Livelink (OpenTextCorp., Waterloo, Ontario, Canada), SherpaWORKS (Sherpa Corp., Milpitas, Calif., USA), and CADIM/EDB (Eigner+Partner AG, Karlsruhe, Germany). Several software suppliers supplement their systems with interfaces that are based either partly or entirely on the Internet and WWW technology, thus easily providing worldwide operation of the system.

Project planning and management and, on the other hand, management of documents related to the project are separate processes carried out by means of information technology. This is evident particularly in decentralized projects with a plurality of participants, such as subcontractors, suppliers, a client, a consultant, etc. The software related to project management and the software for managing documents also operate differently.

Project plans and data related to project schedules are often displayed graphically, and the people processing the plans and the data are accustomed to considering a project as a series of tasks and inter-dependencies between them. Regardless of whether a project planning system operates in a local computer or in a decentralized manner in a server, the graphic outlay of the project schedule is often a Gantt or Pert chart or some other presentation which is arranged for example according to geographical location or schedule and which shows a limited amount of data related to project tasks and their interdependencies.

Management of project data and documents is usually arranged into hierarchical folders according to the product structure or in some other manner, each folder storing the documents and data related to the corresponding part of the product. Such a principle is applied most often in file management systems of both a local computer and a shared server, and also in known systems for storing documents and other data. Documents and other data can be arranged simultaneously into several hierarchical structures for example according to attributes provided in their identification data.

Due to the complicated problems involved and the different operating principles of the programs, it is difficult to form an overall picture of a project since the time dependence of the project and the documents related to the project contents cannot be viewed as a single logical entity. An unclear overall picture results in such problems as underutilization of resources, failed schedules, etc. A person using information related to the project finds it difficult for example to employ different applications and user interfaces for project and document management with no synergy between them.

European Patent 209,907 discloses a user interface which enables the input of data simultaneously into two different economic applications, such as financial management and inventory management. The underlying problem of the present invention is the opposite of the problem disclosed in the aforementioned patent. The present invention aims at solving the following problem: how to provide users with data extracted from databases and related to project and document management by utilizing synergy between different applications and thus reducing the amount of routine work with a terminal and the likelihood of human errors.

BRIEF DESCRIPTION OF THE INVENTION

An object of the invention is to provide a method and equipment implementing the method so as to solve the aforementioned problem. The objects of the invention are achieved by a method and a system which are characterized by what is disclosed in the independent claims. The preferred embodiments of the invention are disclosed in the dependent claims.

BRIEF DESCRIPTION OF THE DRAWINGS

The invention will be described below in more detail by means of preferred embodiments with reference to the accompanying drawings, in which.

DETAILED DESCRIPTION OF THE INVENTION

Figure 1:
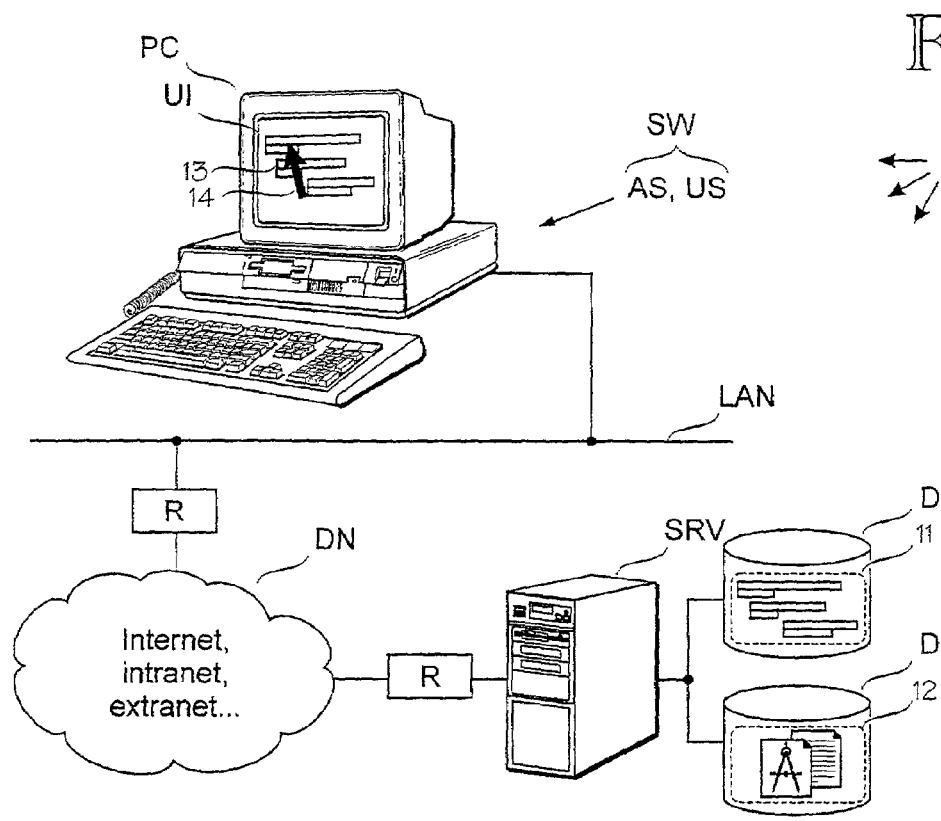
FIG. 1 shows a decentralized computer system where the invention can be applied.

FIG. 1 shows an example of a decentralized system where the invention can be used or applied. The entire system is denoted by reference numeral 10. The components of the system that are essential for understanding the invention include one or more personal computers PC, a user interface UI of a computer, user interface software US of a computer, a project management database DB1, a document management database DB2, application software AS for using data stored in the databases DB1 and DB2, and a data network DN connecting the different parts. The user interface software US and the application software AS are denoted by a common reference SW (Software). In the example of FIG. 1, the data network is an IP-based network, such as the Internet or a restricted subnetwork thereof, for example an intranet or an extranet. The databases DB1 and DB2 are controlled by a separate server SRV. All the computers PC and the server SRV of each unit can be connected to the data network DN via a local area network LAN and routers R.

The computer PC is typically an open architecture computer suitable for office work, but it can also be a graphical terminal if the actual processing takes place in a separate (not shown in the figure) central processor. A user interface UI comprises means for communicating with the user. The means comprise a display unit, a keyboard and typically also a mouse or some other pointer, such as a touchpad in a laptop computer, or the like.

The project management database DB1 typically comprises data about resources, such as people, tools and materials, required to carry out the project, and about schedules of the entire project and the phases thereof. This time/resource data is denoted by reference numeral 11. The document management database DB2 typically comprises construction drawings, work specifications and other information required to execute each phase. These documents are denoted by reference numeral 12. It should be noted that the two databases DB1 and DB2 are shown as two separate physical devices only for the sake of clarity. In reality the data 11 and 12 can be stored on a single physical memory means, such as a hard disk of the computer PC or the server SRV. Alternatively, one or both of the databases DB1 and DB2 can be decentralized, in which case they can be indicated for example by a TCP/IP address. However, details related to the location of the data are not essential to the invention.

The user interface software US of the computer comprises means for accessing the project management database DB1 and the document management database DB2. There are several commercial examples of executing these functions. The user interface software US typically displays the time/resource data 11 in the form of graphical symbols 13, from which the user selects one at a time by a pointer (such as a mouse pointer) 14.

The data network DN connecting the different parts of the system 10 is typically implemented so that each unit has a LAN which connects the computers in the unit. The LANs of the units can be interconnected for example via the Internet. To maintain confidentiality, it is preferable to use a protection mechanism, such as the https protocol or some form of encryption, for example Pretty Good Privacy. The data network DN is not necessary, and the invention can also be applied in a single computer, but the invention provides the best advantages in complicated decentralized systems comprising several separate computers.

Figure 2:
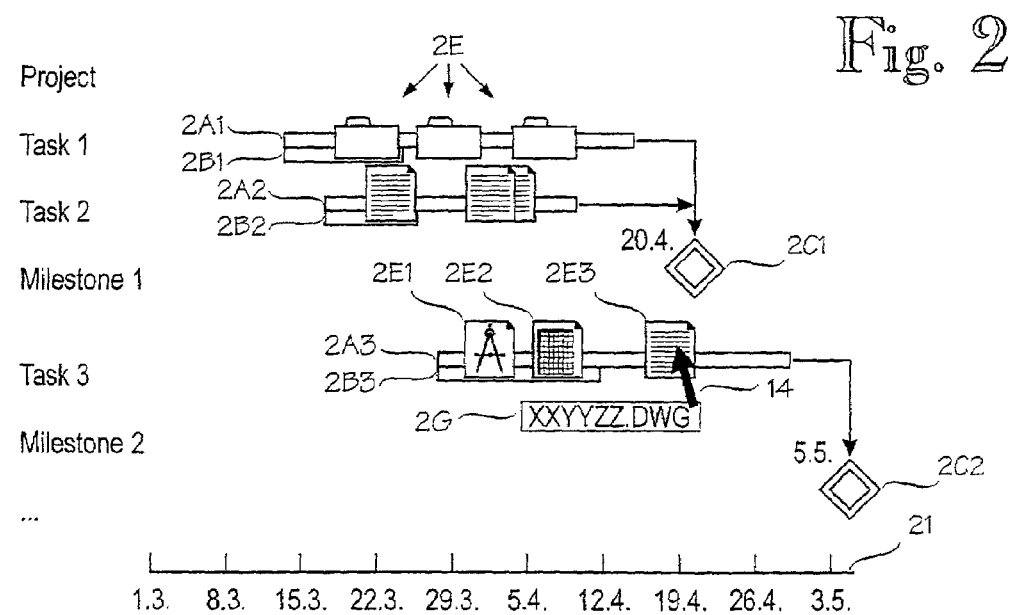
FIG. 2 shows a user interface of the invention by means of a Gantt chart illustrating the progression of the project.

FIG. 2 shows an embodiment of a user interface according to the invention. The user interface is used to form a graphical presentation combining the project schedule or other project management data to be processed with the related documents or other data and the identification data thereof. The graphical presentation comprises data related to schedules of different subprojects or tasks, or other information in the same manner as they are normally displayed in connection with project management software, for example. FIG. 2 shows as an example a Gantt chart. A typical Gantt chart depicts different tasks (Task1-Task3) by bars 2A1 to 2A3 so that the beginning and end of each bar represent the times the corresponding task starts and ends on a time axis 21. The bars 2A1 to 2A3 are usually associated with corresponding adjacent bars 2B1 to 2B3 indicating the proportion of the task that has already been performed. Furthermore, the Gantt chart may comprise milestones 2C1 and 2C2, which mark the times for checking operations related to the progression of the project.

In a preferred embodiment of the invention, the Gantt chart comprises graphical symbols, such as icons 2E, which operate as links to corresponding documents and/or folders. In the example of FIG. 2, icons 2E1 to 2E3 are similar to a paper document. If several documents are related to the same subproject, an icon may point at the folder (directory) where the documents are stored. Clicking the icon with the pointer (mouse) at least helps the user to open the document or folder in question. If the icon is a link to a single document, clicking on the icon may open the document. If several documents are related to the task in question and the icon operates as a link to the folder storing the documents, clicking on the icon displays the folder, from which the user may then separately select the documents he wants. There are preferably different icons for each type of document. For example, icon 2E1 indicates a drawing, icon 2E2 a spreadsheet document, and icon 2E3 a text document. It is also preferable that the colour of the icon shows the current state of the document for example in the following manner: red=unfinished, yellow=under assessment, green=accepted. According to yet another preferred embodiment, pointing with the mouse pointer 14 at an icon (in this case 2E3) displays the identification data 2G of the document.

Figure 3A:
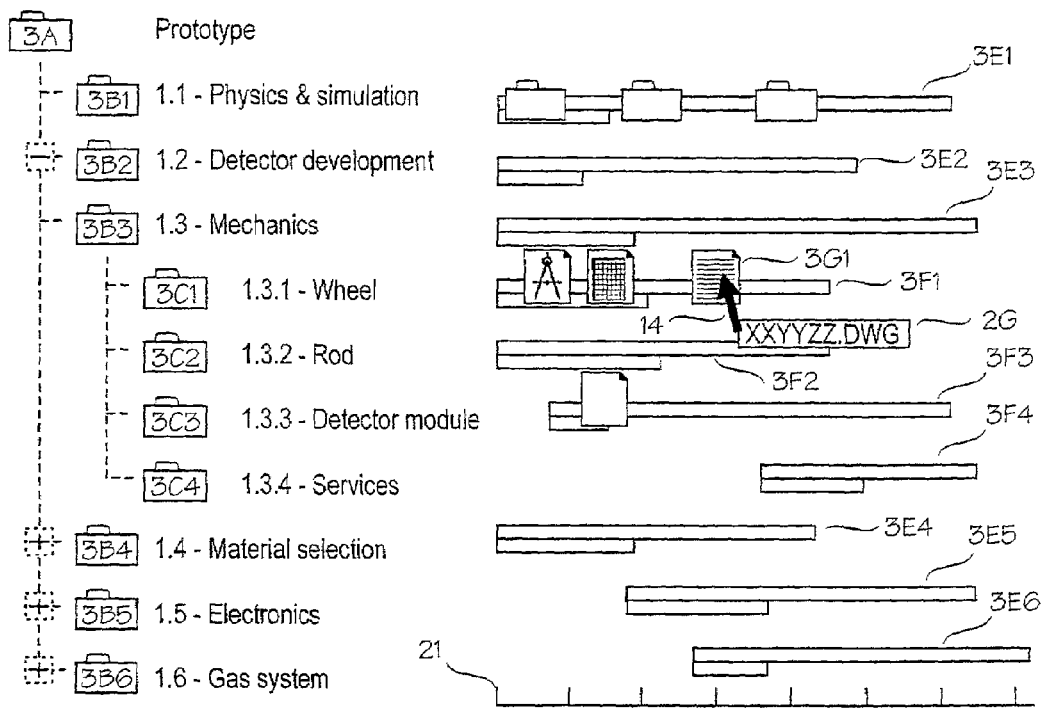
FIGS. 3A and 3B show preferred embodiments of the user interface according to the invention.

FIG. 3A shows a sophisticated modification of the user interface shown in FIG. 2. The user interface of FIG. 3A is hierarchical, i.e. selecting an entity introduces the related lower-level entities. This presentation utilizes a three-level classification: the highest level is a 'project', the next level is a 'subproject', and the third level is a 'subsubproject'. Icon 3A is used to select a particular project. Icons 3B1 to 3B6 (and resource and document data 3E1 to 3E6 at the same lines) correspond to subprojects thereof. Subproject 1.3 (mechanics) comprises four subsubprojects 1.3.1 to 1.3.4 with their respective icons 3C1 to 3C4 (and resource and document data 3F1 to 3F4 at the same lines).

Figure 3B:
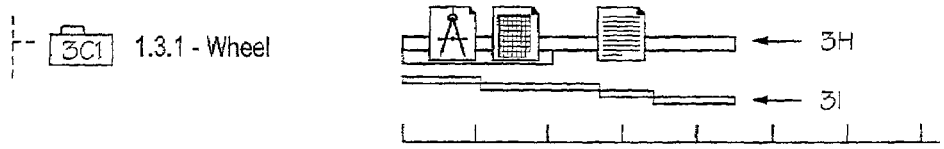

FIG. 3B shows another manner of processing a new hierarchical level without increasing the size of the user interface. In this case selecting project 3H displays the different phases of the next hierarchical level 3I.

Figure 4:
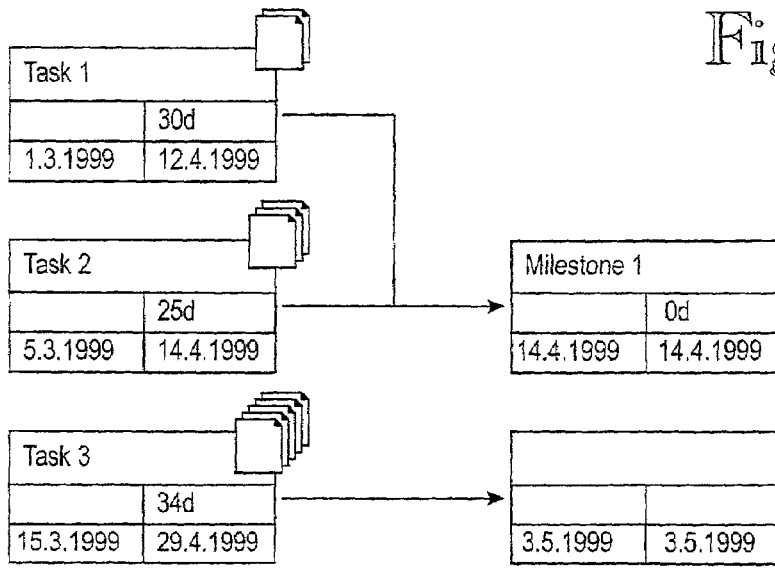
FIG. 4 shows a user interface of the invention by means of a Pert chart illustrating the progression of the project.

FIG. 4 shows a user interface according to the invention in the form of a Pert chart. The method according to the invention of combining resource and document data is evident on the basis of the above description without a need to explain specifically the elements shown in the figure.

Figure 5:
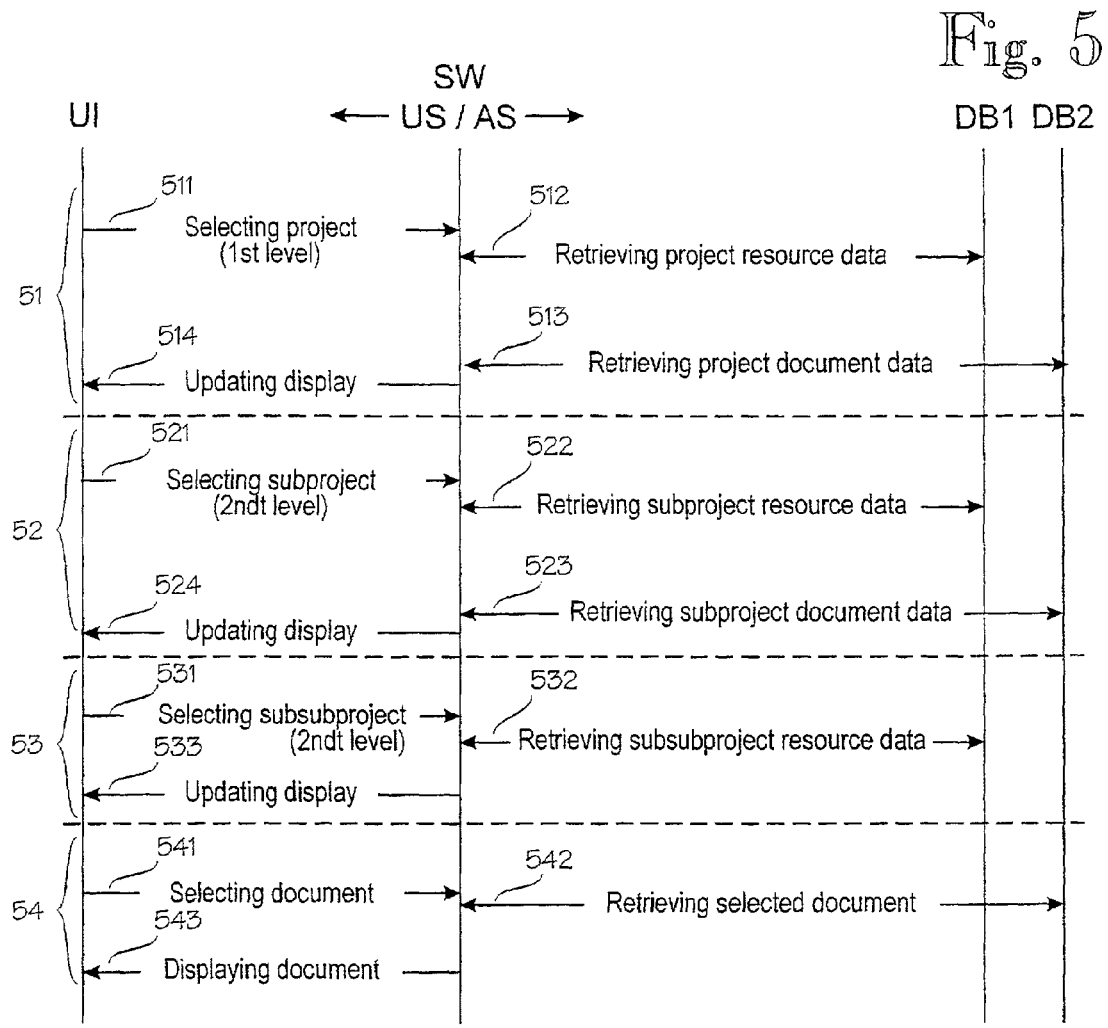
FIG. 5 shows a signalling diagram for implementing a user interface according to the invention.

FIG. 5 is a signalling diagram illustrating the background processes carried out by the software SW of the invention in order to implement a user interface UI. The software SW has two main components: the user interface software US implements the user interface UI and the application software AS controls the time/resource data 11 and the documents 12 stored in the databases DB1 and DB2.

In step 511, the user selects a particular project for examination. This can be implemented similarly as conventional file management in a graphical user interface. In step 512, the software SW retrieves the project management data (schedules, resources, etc.) related to the selected project from the project management database DB1. In step 513, the data of the corresponding documents is retrieved, and in step 514 the highest-level data of the project is displayed in the user interface UI. In FIG. 3A such highest-level data would be related to icons 3B1 to 3B6, and 3E1 to 3E6 (but not 3C1 to 3C4, and 3F1 to 3F4).

In step 521, the user selects a particular subproject (in this case 1.3, mechanics, icon 3B3) for examination. In steps 522 and 523, the software SW retrieves the resource and document data related to the subproject from the project management database DB1 and the document management database DB2. In step 524, this data is used to display the information related to icons 3C1 to 3C4, and 3F1 to 3F4.

In step 531, the user specifies his selection by choosing a particular subproject for enlargement. In step 532, the software SW retrieves the data of the subsubproject in question (in this case 1.3.1, wheel, icon 3C1) from database DB1 (unless the data was retrieved already in step 522). In step 533, the software SW displays an enlarged view of the subsubproject in question (see FIG. 3B).

In step 541, the user selects a single document for reading by placing the mouse pointer 14 on top of the corresponding icon, for example icon 3G1. In such a case it is preferable that the software SW displays the identification data 2G of the document at the mouse pointer 14. When the user has confirmed his/her selection by clicking the mouse button (once or twice), in steps 542 and 543 the document is retrieved from database DB2 and opened by a suitable application program, such as a word processing program.

The steps described above (step 511, etc.) form sections 51 to 54, where the first operation is performed by the user and the subsequent operations are carried out by the software SW in response to the operation executed by the user. Each section can naturally be executed independently of the others an arbitrary number of times by selecting a different subproject and/or document for examination.

It is obvious to those skilled in the art that as the technology develops the basic idea of the invention can be implemented in various ways. The invention and the embodiments thereof are thus not restricted to the examples described above but they may vary within the scope of the claims.

The invention claimed is:

1. A computer-implemented method for managing time data and documents of a project in response to commands given by a user, the project comprising several subprojects; the method comprising:

displaying a user interface comprising a time axis; and for each of the several subprojects:

displaying a first symbol having a beginning and an end for indicating, respectively, the beginning and end of the subproject in relation to the time axis;

displaying at least one second symbol on the time axis, associated with the subproject between the beginning and the end of the first symbol, for indicating a document or document folder relating to the subproject; and;

in response to the user selecting one of the at least one second symbol, at least providing the user with an opportunity to open a document or document folder indicated by the selected second symbol.

2. A computer system comprising a first database and a second database for storing, respectively, time data (11) and documents (12) of a project, the project comprising several subprojects;

a user interface configured to manage the time data and documents in response to commands given by a user, the user interface comprising a time axis and for each of the several subprojects:

a first symbol having a beginning and an end for indicating, respectively, the beginning and end of the subproject in relation to the time axis; and at least one second symbol on the time axis, associated with the project, placed between the beginning and the end of the first symbol, which indicates a document or document folder relating to the subproject wherein the computer system is configured to be responsive to the user selecting one of the at least one second symbol by at least providing the user with an opportunity to open a document or document folder indicated by the selected second symbol.

3. The computer system of claim 2, wherein the at least one second symbol indicates both a document and its type.

4. The computer system of claim 2 or 3, wherein the at least one second symbol indicates both a document and its state of readiness.

5. A computer program product, executable in a computer system having a user interface, the computer program product comprising program code for carrying out the method of claim 1.

\* \* \* \* \*